(12) United States Patent
Fennel

(10) Patent No.: US 6,341,827 B1
(45) Date of Patent: Jan. 29, 2002

(54) BRAKE SYSTEM WITH A REAR AXLE ANTI-LOCKING ARRANGEMENT

(75) Inventor: Helmut Fennel, Bad Soden (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/555,424
(22) PCT Filed: Nov. 12, 1998
(86) PCT No.: PCT/EP98/07248
§ 371 Date: Jul. 19, 2000
§ 102(e) Date: Jul. 19, 2000
(87) PCT Pub. No.: WO99/28173
PCT Pub. Date: Jun. 10, 1999

(30) Foreign Application Priority Data

Nov. 27, 1997 (DE) .......................... 197 52 487
May 22, 1998 (DE) .......................... 198 22 917

(51) Int. Cl.⁷ .............................................. B60T 8/32
(52) U.S. Cl. .................. 303/138; 303/166; 303/167; 303/186; 303/DIG. 6; 303/9.62; 303/113.5
(58) Field of Search ............... 303/138, 166, 303/167, 168, 169, 171, 113.1, 186, DIG. 6, 9.62, 113.5

(56) References Cited

U.S. PATENT DOCUMENTS

| | | | | |
|---|---|---|---|---|
| 3,629,815 A | * | 12/1971 | Hattwig ....................... 303/138 |
| 4,070,562 A | * | 1/1978 | Kuno et al. .................. 303/138 |
| 4,421,359 A | * | 12/1983 | Hayashi et al. ............. 303/9.61 |
| 4,790,607 A | * | 12/1988 | Atkins ......................... 303/109 |
| 5,139,115 A | * | 8/1992 | Browne et al. .............. 303/138 |
| 5,150,950 A | * | 9/1992 | Arikawa et al. ........... 303/113.1 |
| 5,282,641 A | * | 2/1994 | McLaughlin ................. 280/432 |
| 5,294,191 A | * | 3/1994 | Giorgetti et al. ................ 303/3 |
| 5,462,342 A | * | 10/1995 | Goebels ....................... 303/186 |
| 5,480,221 A | * | 1/1996 | Morita et al. ............. 303/113.5 |
| 5,492,396 A | * | 2/1996 | Weber ......................... 303/149 |
| 5,632,535 A | * | 5/1997 | Luckevich et al. ......... 303/186 |
| 5,934,770 A | * | 8/1999 | Okazaki ...................... 303/150 |

* cited by examiner

Primary Examiner—Robert J. Oberleitner
Assistant Examiner—Devon Kramer
(74) Attorney, Agent, or Firm—Rader, Fishman & Grauer PLLC

(57) ABSTRACT

In an automotive vehicle brake system with an arrangement (rear-axle ABS) which controls or regulates the braking pressure or the brake force on the rear wheels and prevents locking of the rear wheels, the front wheels and the rear wheels are individually equipped with rotational speed sensors. Further, the distribution of the brake force to the front and rear axle (EBD function) is controlled or regulated on the basis of the rotational speed sensor signals and by means of the arrangement (rear-axle ABS) which prevents locking of the rear wheels. In addition, there is provision of an indicator and/or alarm device which signals the imminent locking of a front wheel or the second front wheel to the driver.

2 Claims, 1 Drawing Sheet

BRAKE SYSTEM WITH A REAR AXLE ANTI-LOCKING ARRANGEMENT

TECHNICAL FIELD

The present invention relates to an automotive vehicle brake system with an arrangement that controls or regulates the braking pressure or the brake force in the rear-wheel brakes.

BACKGROUND OF THE INVENTION

DE 196 40 588 A1 discloses an automotive vehicle brake system of this type which has an arrangement that prevents locking of the rear wheels, with rotational speed sensors and an electronic circuit for evaluating the sensor signals and for generating braking pressure or brake force control signals, wherein the front wheels and the rear wheels are individually equipped with rotational speed sensors, and wherein the distribution of brake force onto the wheels of the front axle and the rear axle is controllable or adjustable on the basis of the rotational speed sensor signals and by means of the arrangement which prevents locking of the rear wheels.

Brake systems with anti-lock arrangements (ABS) are. However, it is also known in the art to provide an anti-lock arrangement for the rear wheels only because locking of the rear wheels, as is known, involves the risk of swerving and because the load on the rear axle can vary within wide limits depending on the number of passengers or the useful load. Of course, limiting the control system to the rear wheels causes (and this is the sole advantage) major economies compared to a system which acts on all wheels. The cost and effort in manufacture of medium-size and small-size passenger cars, light trucks, etc., is even today a decisive reason for fitting an ABS, or doing without it.

To simplify and reduce costs for a traction slip control system, it has been disclosed to include the driver in the control cycle (German patent No.35 27 532). To this end, a risk of instability or an excessively high drive torque is signaled to the driver in order that he/she can decrease the drive torque of the vehicle engine by reducing the adjusting force applied to the accelerator pedal and thereby intervene actively into the regulating or control process. Interaction by the driver is relatively uncritical in a system of this type because only starting to drive is rendered more difficult in the event of a too high drive torque, whereas dangerous situations will not occur.

An object of the present invention is to minimize the expenditure in manufacture for a controlled automotive vehicle brake system of the above-mentioned type, without excessively burdening the driver or even jeopardizing the function of the system and/or the safety of the vehicle.

It has been found that this object can be achieved by the automotive vehicle brake system described in the accompanying claims, the special features of which include that the front wheels and the rear wheels are individually equipped with rotational speed sensors, that the distribution of brake force onto the wheels of the front axle and the rear axle is controllable or adjustable on the basis of the rotational speed signals and by means of the arrangement which prevents locking of the rear wheels, and that finally there is provision of an indicator and/or alarm device which signals the imminent locking of a front wheel or the second front wheel to the driver.

Thus, the present invention is based on the knowledge that a technically advanced brake system can be achieved with comparatively low effort and structure by equipping a rear-axle anti-lock arrangement (rear-axle ABS, in short) with a complete ABS sensor system, i.e., with three or four rotational speed sensors, and further by warning the driver, at the latest when the second front wheel, too, shows a tendency to lock. Despite its simple structure and the low effort in manufacture, a system of this type is well suited for the electronic control of brake force distribution (EBD control) and for anti-lock control of the rear wheels and for warning about instability (or imminent locking) of the front wheels and the pertinent jeopardizing of steerability.

The brake system of the present invention is principally a rear-wheel anti-lock arrangement (rear-axle ABS) which was supplemented by two additional sensors that detect the rotational behavior of the front wheels, and by an extended electronics system or software and by an optical or acoustic alarm device to achieve a complete control system, i.e., an anti-lock arrangement and an EBD control.

The three or four rotational speed sensors which are comprised in the brake system of the present invention permit performing an overall vehicle condition analysis by sensing, evaluating and comparing the rotational behavior of the individual wheels. The results of the analysis will then be included in the control. On the basis of the sensor signals which are such processed and combined, it is rendered possible to realize, for example, also a bumpy-road detection, that is, to obtain a signal by which the control may be adapted even better to the respective road conditions.

DETAILED DESCRIPTION OF THE PREFERRED EMBODIMENTS

Figure 1:
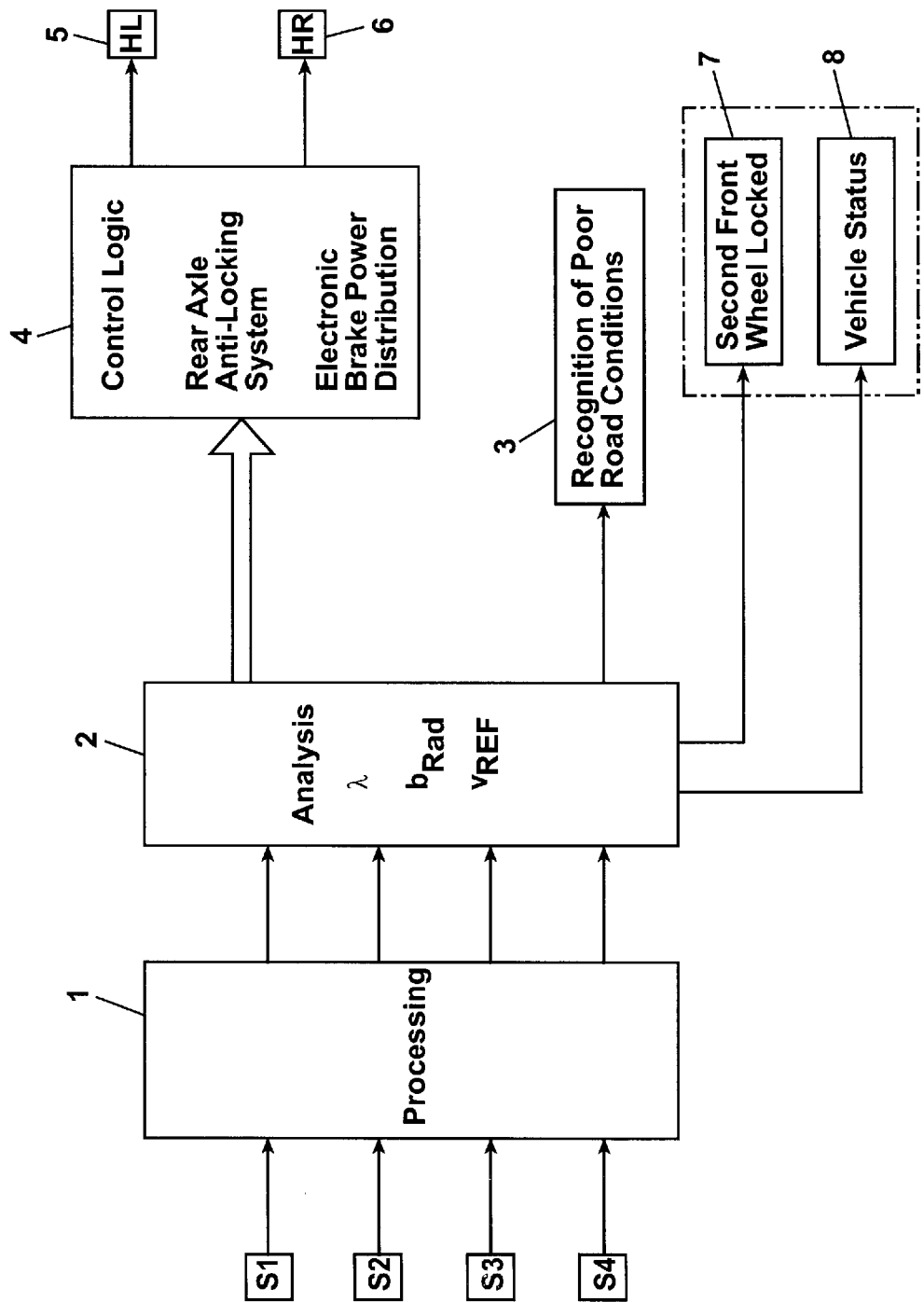
FIG. 1 is a symbolic view, exhibiting the basic electronic components of a brake system of the type of the present invention and serves to explain the operation of a brake system of this type.

In the illustrated embodiment of the present invention, the rotational behavior of the individual vehicle wheels is sensed by means of three or four rotational speed sensors S1 to S4 individually per wheel. Instead of the rear-wheel sensors, one single differential sensor may also be sufficient in case the vehicle has a rear-wheel drive.

After conditioning of the sensor signals in a conditioning circuit 1, the signals are evaluated, logically combined and analyzed in a known fashion in a circuit 2. For example, a vehicle reference speed $v_{REF}$, slip signals $\lambda$, wheel and vehicle deceleration signals b, further time derivatives of individual signals, etc., are produced. On the basis of these signals which found on the rotational behavior of the individual wheels, it is possible to conduct a comprehensive analysis of the instantaneous vehicle condition and the driving situation, for example, the instantaneous driving stability, the imminent instabilities, and the road surface conditions.

A bumpy-road detection, represented by block 3 in the drawing, is also possible.

The results of the sensor signal evaluation and the analyses are then processed in a control logic 4 on the basis of simple or complex algorithms, with the objective of obtaining braking pressure control signals by which hydraulic valves or other actuators 5, 6 can be actuated that influence the braking pressure or the brake force on one rear wheel respectively. Finally, locking of the rear wheels is prevented and, thus, their stability ensured and EBD control performed by means of the valves or actuators 5, 6.

Further, an indicator and alarm device 6, 7 is connected to the evaluating and analyzing circuit 2 according to the embodiment of the present invention shown. Device 6, 7 is composed of an optical or acoustic alarm signal generator 7 and a vehicle condition display 8. The alarm signal generator 7 sounds or flashes up as soon as the second front wheel (hence: both front wheels) will lock or show a tendency to lock. It may be suitable and can be realized with relatively little effort to vary the intensity (loudness or illuminating power of the alarm signal generator 7) in dependence on the respective driving situation, on the instantaneous vehicle speed, or the imminent risk in the respective situation which is assessed in a different way.

As can be taken from the preceding explanations, the present invention permits achieving a relatively simple, inexpensive arrangement which, in contrast to the state-of-the-art complete ABS systems that act on all four wheels, prevents only locking of the rear wheels, which, however, has been extended to an (almost) complete system by additional sources of information, i.e., by the full sensor equipment, and by the optical signaling of critical conditions such as the imminent locking of the front wheels, and by cooperation of the driver.

What is claimed is:

1. Automotive vehicle brake system, comprising:

means for delivering power to the rear wheels of a vehicle, means for preventing the locking of the rear wheels exclusively, by which the braking pressure or the brake force on the rear wheels can be controlled or regulated, with rotational speed sensors, and with an electronic circuit for evaluating the sensor signals and for generating braking pressure or brake force control signals, front wheel rotational speed sensors, a joint differential sensor fixed to a rear differential gear, and wherein the distribution of brake force onto the wheels of the front axle and the rear axle is controllable or adjustable on the basis of the sensor signals and by means of the arrangement which prevents locking of the rear wheels, an indicator which signals the imminent locking of at least one front wheel to the driver.

2. Brake system as claimed in claim 1, wherein the locking of at least one front wheel is signaled optically or acoustically, and the intensity of the signal is variable in dependence on the respective vehicle speed or the respective risk.

* * * * *